United States Patent
Ganea

(10) Patent No.: US 7,253,819 B1
(45) Date of Patent: Aug. 7, 2007

(54) APPARATUS AND METHOD FOR REPRESENTING VISUAL INFORMATION FOR EMBEDDED HANDHELD DEVICES

(75) Inventor: Alexandre Ganea, Montreal (CA)

(73) Assignee: Majesco Holdings, Inc., Edison, NJ (US)

( * ) Notice: Subject to any disclaimer, the term of this patent is extended or adjusted under 35 U.S.C. 154(b) by 282 days.

(21) Appl. No.: 11/104,200

(22) Filed: Apr. 12, 2005

Related U.S. Application Data

(60) Provisional application No. 60/562,960, filed on Apr. 16, 2004.

(51) Int. Cl.
*G09G 5/02* (2006.01)
*G06K 9/00* (2006.01)
*G03F 3/08* (2006.01)
*G06K 15/00* (2006.01)
*H04N 1/48* (2006.01)

(52) U.S. Cl. .................. 345/600; 345/589; 345/591; 345/596; 345/604; 358/518; 358/520; 382/162; 382/167

(58) Field of Classification Search ........ 345/589–593, 345/596–597, 600–605, 690, 69, 586, 606, 345/643–644; 382/162–167; 358/3.16, 358/3.1, 3.19, 515–520
See application file for complete search history.

(56) References Cited

U.S. PATENT DOCUMENTS

| | | | | |
|---|---|---|---|---|
| 5,227,863 A | * | 7/1993 | Bilbrey et al. | 348/578 |
| 5,432,893 A | * | 7/1995 | Blasubramanian et al. | 345/600 |
| 6,326,977 B1 | * | 12/2001 | Westerman | 345/591 |

* cited by examiner

*Primary Examiner*—Wesner Sajous
(74) *Attorney, Agent, or Firm*—Dov Rosenfeld; Inventek

(57) ABSTRACT

Displays on embedded devices, such as cell phones, personal digital assistants, and game machines, typically have low color-depth resolution displays. The conversion of color image from high color-depth resolution formats, such as 24-bit per pixel color, to lower color-depth resolution formats for display on low color-depth resolution displays, such as those having 15-bit per pixel color, results in degraded image appearance, especially for 24-bit format images having gradual color changes. The present invention manipulates the color information of images or video sequences and improves the appearance of the display by dithering representations of the images in a color space having a luminance coordinate.

30 Claims, 6 Drawing Sheets

$$\begin{bmatrix} Luma \\ C_B \\ C_R \end{bmatrix} = \begin{bmatrix} 0.2857 & 0.5714 & 0.1429 \\ -0.1429 & -0.2857 & 0.4286 \\ 0.3571 & -0.2857 & 0.0714 \end{bmatrix} * \begin{bmatrix} R \\ G \\ B \end{bmatrix}$$

FIG. 4A $$\begin{bmatrix} R \\ G \\ B \end{bmatrix} = \begin{bmatrix} 1 & 0 & 2 \\ 1 & -0.5 & 1 \\ 1 & 2 & 0 \end{bmatrix} * \begin{bmatrix} Luma \\ C_B \\ C_R \end{bmatrix}$$

APPARATUS AND METHOD FOR REPRESENTING VISUAL INFORMATION FOR EMBEDDED HANDHELD DEVICES

CROSS-REFERENCE TO RELATED APPLICATIONS

This application claims the benefit of U.S. Provisional Application No. 60/562,960, filed Apr. 16, 2004, the contents of which are incorporated herein by reference.

BACKGROUND OF THE INVENTION

The present invention generally relates to the storage of color image information, and more particularly to a method and system for representing and displaying color images on limited color-depth resolution displays.

Over the years, portable, e.g., hand-held game machines have been, and continue to be, very popular. Typically, these portable game machines include a hand-held game machine housing a display for displaying images and a game processing unit, and associated hardware for running a game program. The game program itself is typically contained in a game program memory such as, for example, a semiconductor memory (e.g., ROM, EPROM, etc.) that is part of a removable cartridge. By storing the game program in a removable cartridge, the user can conveniently and easily change the game being played by simply exchanging one cartridge with another, different cartridge containing a different game. Examples of portable game machines are the "Game Boy®" and "Game Boy® Color" products manufactured and sold by Nintendo of America Inc.

Generally, the functionality of conventional portable game machines of the type described above is directed to executing, on a processor in the hand-held game machine, the game that is provided to the game program memory from a particular removable cartridge in response to user input. When using the portable game machine, visual and auditory feedback is provided to the user. The visual and auditory content is stored in compressed form in the removable cartridge along with programming information to instruct the processor in the game machine to decompress the content. The visual content is displayed to the user on a color or monochrome display, such as a liquid crystal display (LCD), and the auditory content is provided via a speaker that is part of the hand-held game machine or via a socket for a headphone jack on the machine.

A prior art exemplary embedded device is illustrated in FIGS. 1A, 1B, and 1C, which show a portable (hand-held) color display game machine (hereinafter, referred to simply as "game machine") 10 that displays game characters in color on a color liquid crystal display (LCD) 16 when a prior art color-ready game cartridge 12 is selectively inserted into a slot 18, and in FIG. 2 as an overall block diagram of the game machine and game cartridge. Batteries (not shown), e.g., 2 AA batteries provide power for game machine 10, which may also be configured for connection to an AC adapter to permit extended use without batteries. Game machine 10 is a prior art game machine and is described, for example, in U.S. Pat. No. 6,716,103, incorporated herein by reference.

The color LCD 16 displays either color or black and white depending on the type of game cartridge 12 inserted into the game machine 10. With reference to FIG. 2, prior art game machine 10 includes color LCD 16 as described above, and is formed as a dot matrix display and is driven by LCD drivers 22 and 24 to display color images on its screen. LCD driver 22 selectively drives, for example, the rows of the dot matrix display and LCD driver 24 selectively drives, for example, the columns of the dot matrix display. LCD drivers 22, 24 are supplied with color image signals from a color display processing circuit 28 included in a central processing unit (CPU) 25.

Programs for operating game machine 10 are provided through a connector 40 connected to CPU 25 by an appropriate bus. More specifically, game cartridge 12 shown in FIG. 1A is selectively attachable to connector 40. Game cartridge 12 is preferably in the form of a replaceable memory cartridge that can be inserted into slot 18 of game machine 10 and having a printed circuit board with a connector defining a number of electrical contacts. When game cartridge 12 is inserted into slot 18 of game machine 10, the cartridge electrical contacts mate with corresponding "edge connector" electrical contacts within game machine 10. This action electrically connects the printed circuit board to the electronics within game machine 10. In this example, the printed circuit board of game cartridge 12 at least includes a read-only memory (ROM) 42 and a read/write memory (e.g., SRAM) 46. ROM 42 stores instructions and other information pertaining to a particular video game. ROM 42 for one game cartridge 12 may, for example, contain instructions and other information for an adventure game while the ROM of another game cartridge 12 may contain instructions and other information for a car race game or an educational game, for example. To play a game, a user of game machine 10 need only plug the appropriate game cartridge into slot 18 of game machine 10 thereby connecting the cartridge's ROM 42 (and any other circuitry it may contain) to game machine 10. This enables the game machine circuitry to access information contained within ROM 42 (and read/write memory 46), which information controls the game machine to play the appropriate video game by displaying images and reproducing sound as specified under control of the ROM game program information. Read/write memory 46 is used to store data such as game backup data.

In accordance with the game program, character data supplied from game cartridge 12 and the controller data from operating keys 48a-48e, CPU 25 executes data processing and writes display data into a display RAM 52, using an extended RAM 50 when necessary. As a result of data processing by CPU 25, images are supplied to display 16 and sound signals to be output are adjusted in level by volume controls 54 and 56, and then outputted to a speaker 58 and/or an earphone jack 60. Sound signals output from speaker 58 and/or earphone jack 60 include game sound effects, voices and music.

Generally speaking, to use game machine 10 to play a game, a user selects a game cartridge 12 containing a desired video game, and inserts that game cartridge into slot 18 of game machine 10, thereby electrically connecting ROM 42 and other cartridge electronics to game machine 10. The user then operates a power switch 21 (see FIG. 1B) to turn on game machine 10 and operates operating keys 48a-48e to control video game play.

Handheld devices are often equipped with displays of limited color-depth resolution due to cost constraints on the devices. As an example, each pixel of the color display of a portable gaming device typically has a total of 15 bits of color-depth resolution. Prior art handheld devices store the color in three color components, red, green, and blue (RGB color space), and thus provide 5 bits of color-depth resolution (32 intensity levels) for each color component. In contrast, desktop computer displays often have 24 bits of color-depth resolution—8 bits (256 intensity levels) for each of the three color components.

In general, 24-bit displays are adequate to provide realistic rendering of most images, while the smaller number of bits available in handheld devices results in a noticeably inferior image. Thus, for example, the displayed content of games is generated using computers with high-color-depth resolution graphics, and thus the image displayed on handheld device can be very different from what the designer of the displayed image intended. Another problem with prior art displays of limited color-depth resolution is that smooth gradations in color appear blocky because of the lack of a more complete color palate. Yet another problem not adequately addressed with prior art systems is contrast control. Handheld devices are meant to be used in a variety of lighting conditions, and thus require effective control of the display contrast. Prior art displays do not provide for contrast control over a wide enough range of lighting conditions.

While the use of limited color-depth resolution displays is required for cost consideration, it is seen that there are many problems associated with the limited color-depth resolution. Thus there is a need in the art for a method and apparatus that permits a better displayed image and an image whose intensity can be better adjusted in response to ambient lighting conditions. Such a method and apparatus should be compatible with current devices, should not add appreciable cost to the devices, and should not add/require appreciable additional computing by the device.

BRIEF SUMMARY OF THE INVENTION

One aspect of the present invention is a method of representing and displaying color information that hopefully provides improved appearance of color images on embedded device displays. Specifically, a method embodiment of the present invention includes dithering the color content of individual pixels to provide the appearance, to the viewer, of smoother color transitions.

Another aspect of the present invention is a carrier medium, e.g., a memory containing a program to instruct a processor to execute a method of representing and displaying color information.

In one embodiment of the invention, the color of images are represented, at some point, in a 3-component (also called 3-coordinate) color space having one component which is, or is related to luminance, and two coordinates that are, or are related to chrominance. Examples of components related to luminance are luminance, intensity, and brightness. There are many 3-component color spaces having one luminance-like and two chrominance-like components, including, but not limited to YUV, YCbCr (also called Luma-Cb—Cr), and YIQ color spaces. Any color space having a luminance-related coordinate and two chrominance-related components is referred to herein as a "YUV-like" color space, including other color spaces not that are not necessarily accepted as standards. The three coordinates of a YUV-like color space are referred to herein as a luminance-like coordinate and two chrominance-like coordinates. Typically, a general property of a YUV-like color space, when converted from a RGB color space, provides a luminance-like component that is a positive combination of R, G, and B, such that that the luminance-like component is monotonically increasing with R, G, and B, and provides two chrominance-like components that are each a function of suitably scaled measures of differences between suitably scaled R, G, and B components.

One aspect of the present invention includes representing the color information in a YUV-like coordinate system that includes a luminance-like component. This aspect of the invention includes, in the case color information is provided in RGB, conversion of an image or series of images from RGB color space to a second color space. In one embodiment of the present invention, the second color space is a YUV-like color space.

Another aspect of the present invention includes dithering an image in a YUV-like color space to reduce the number of bits used to represent the coordinates, such that the appearance of low color-depth resolution images is acceptable. In one embodiment of the present invention, the dithering uses a dithering matrix. In one version, the dither is a 3-bit dither. In another version, the dither is a 4-bit dither.

Another aspect of the present invention includes converting the dithered colors in the reduced color-depth YUV-like space to a reduced color depth RGB space for display.

Another aspect of the present invention includes using a decoding method to decode images presented in a compressed form, the decoding method being easily implemented on existing, limited computing power embedded devices.

One or more of these features together with the various ancillary provisions and features which will become apparent to those skilled in the art from this description, are attained by the exercise device of the present invention, preferred embodiments thereof being shown with reference to the accompanying drawings, by way of example only, wherein:

BRIEF DESCRIPTION OF THE DRAWING

FIG. 4A shows a first embodiment of a transformation from RGB color space to YUV color space;

FIG. 4B shows an embodiment of a transformation from YUV color space to RGB color space that is an inverse of the transformation shown in FIG. 4A;

FIG. 5A shows a 3-bit dither pattern for application to a YUV-like image according to an embodiment of the invention; and FIG. 5B shows a 4-bit dither pattern for application to a YUV-like image according to another embodiment of the invention.

Reference symbols are used in the Figures to indicate certain components, aspects or features shown therein, with reference symbols common to more than one Figure indicating like components, aspects or features shown therein.

DETAILED DESCRIPTION

One embodiment of the present invention is a method of representing and displaying color images on a display having limited color-depth resolution. Another embodiment is a carrier medium carrying code to cause a processor to implement the method of representing and displaying color images on a display having limited color-depth resolution. Such displays are found, for example, in embedded devices, including but not limited to cell phones, personal digital assistants, and portable game machines. While the embodiments presented herein describe the invention in terms of displaying color video on a game machine, the invention is not limited to these embodiments, as will become apparent to those in the art upon consideration of the following description.

Figure 1A:
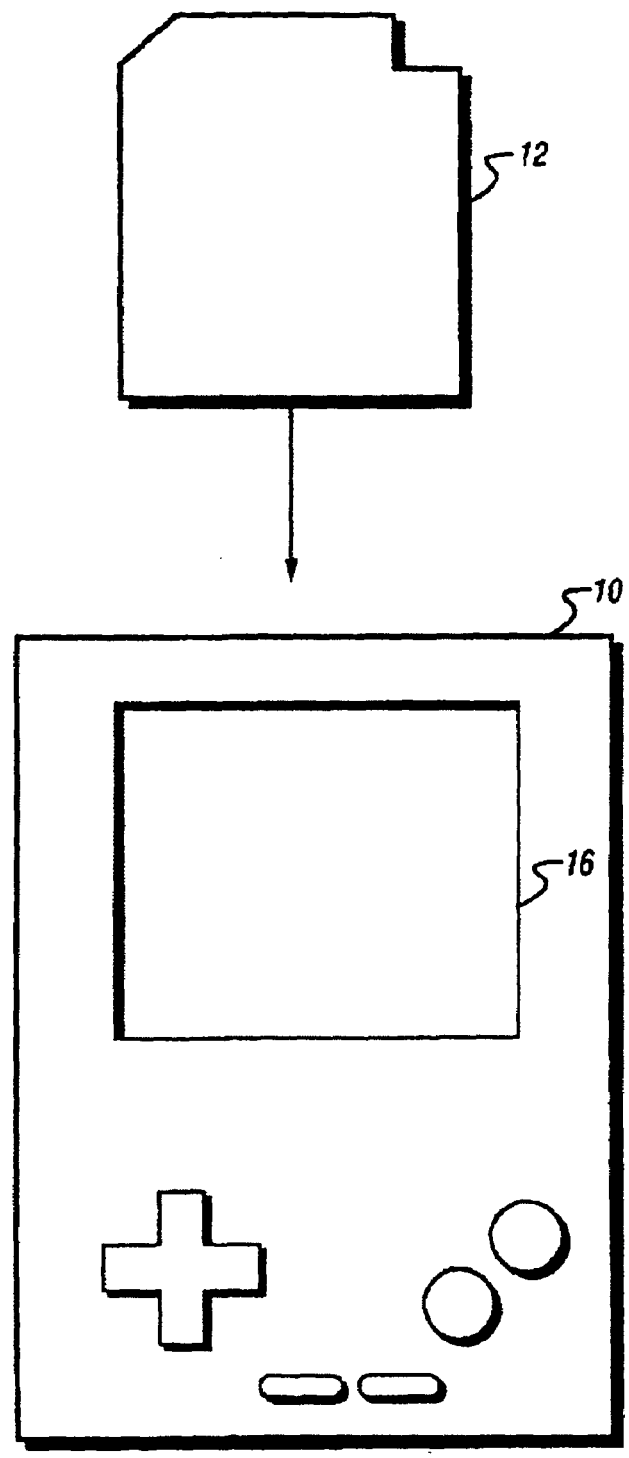
FIGS. 1A-1C show a prior art portable (handheld) game machine.
Figure 1B:
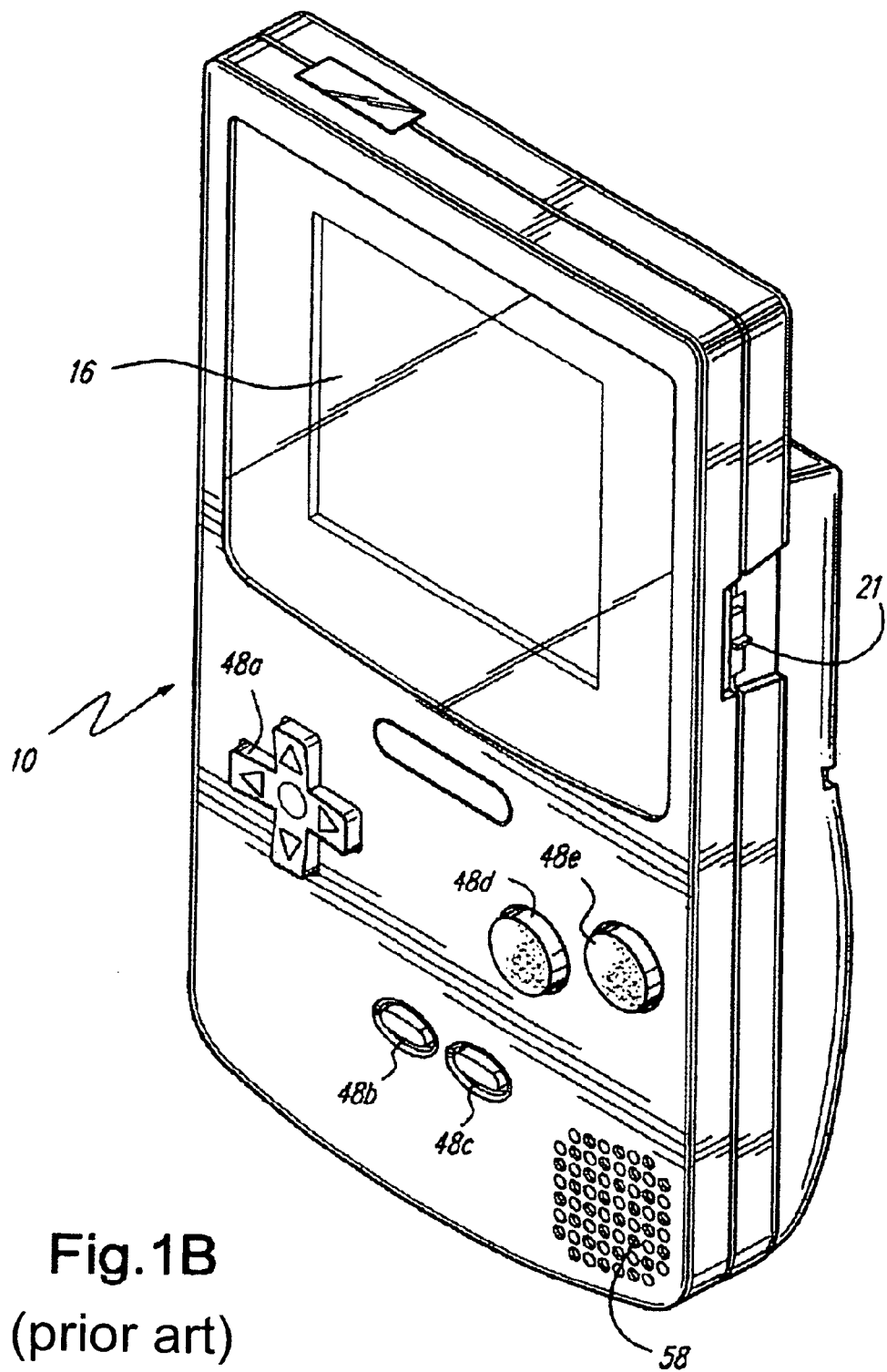
Figure 1C:
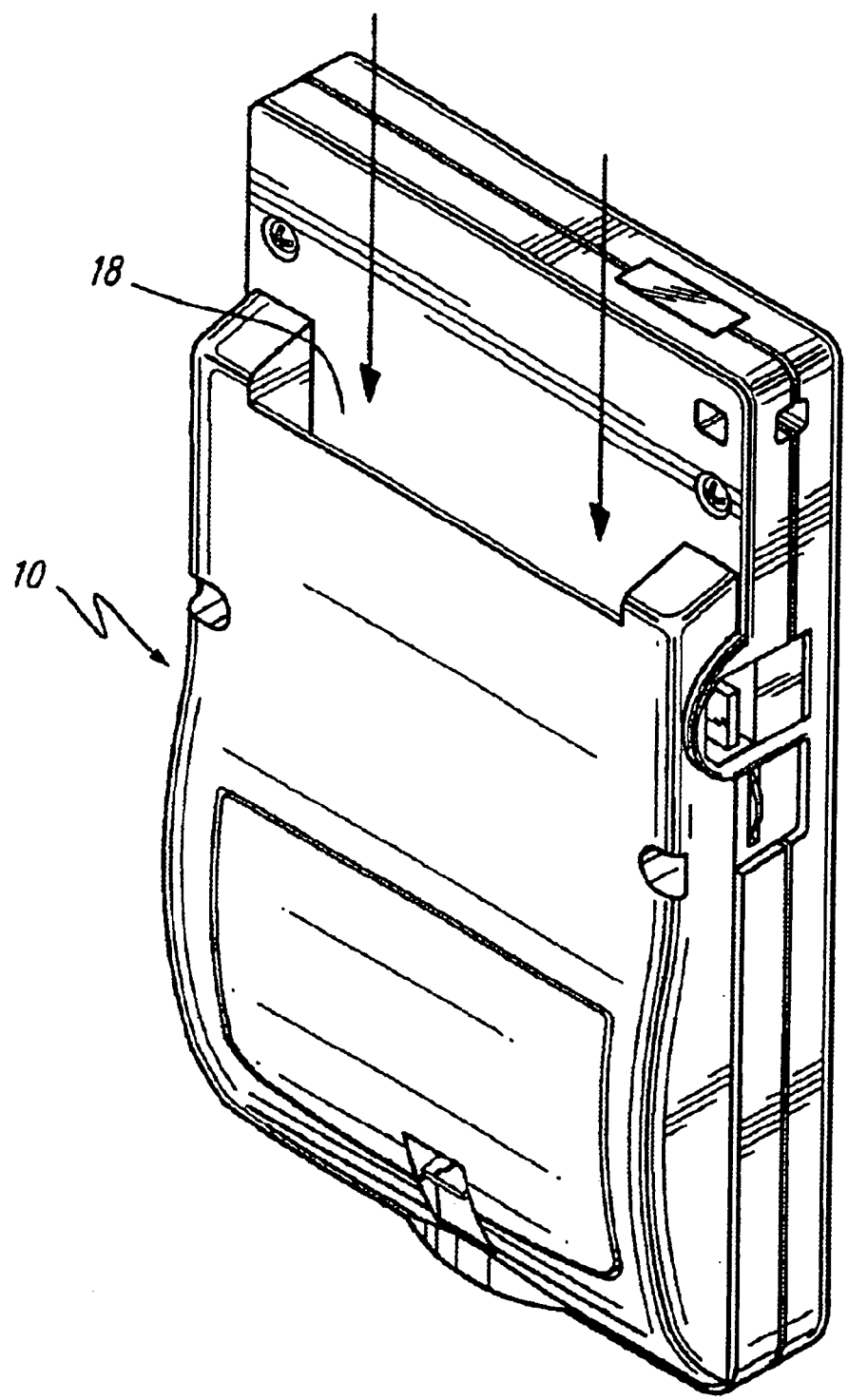
Figure 2:
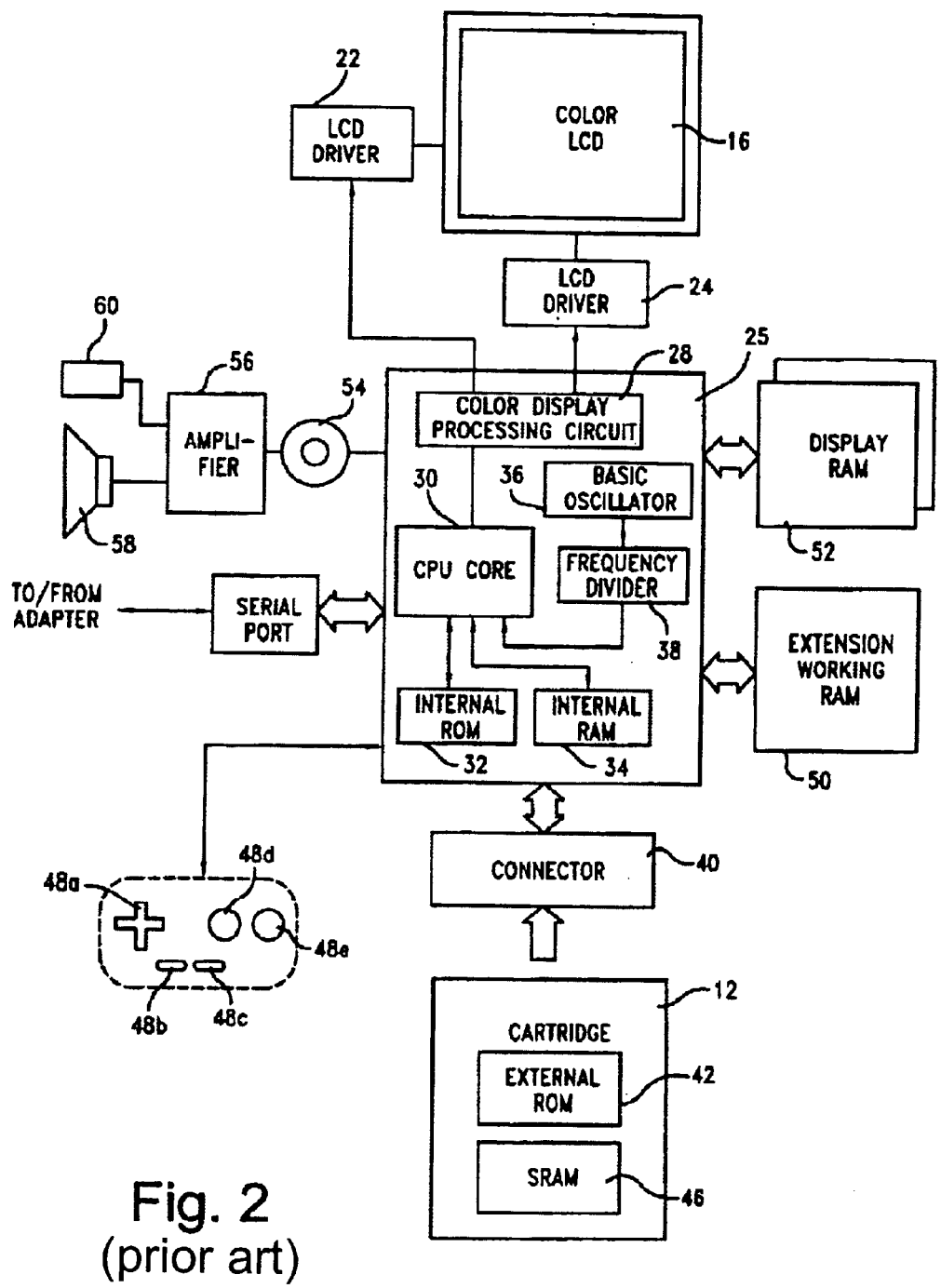
FIG. 2 shows a block diagram of a prior art game cartridge and the game machine shown in FIGS. 1A-1C.
Figures 3A, 3B:
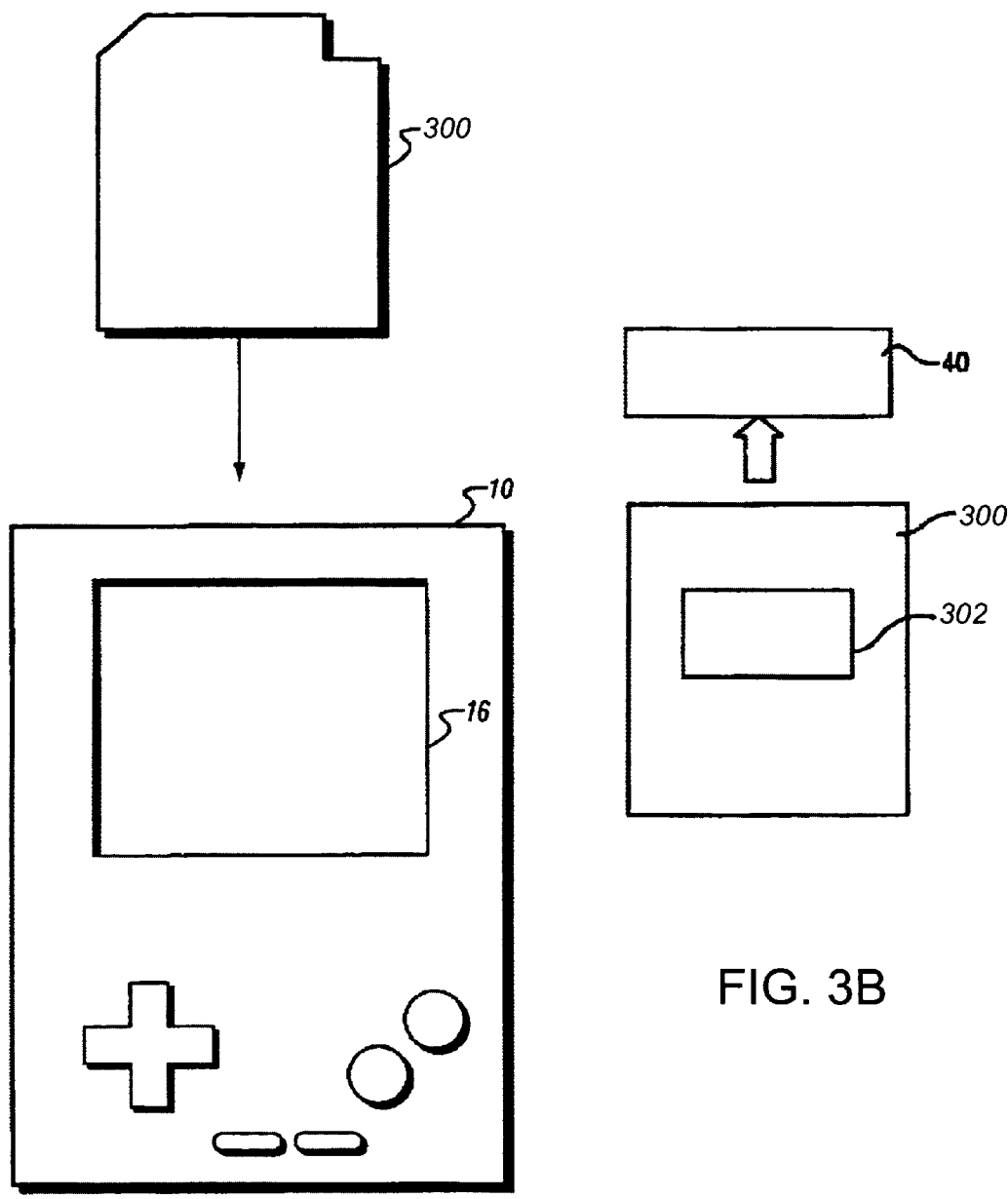
FIG. 3A shows a game cartridge that includes aspects of the present invention and a prior art hand-held game machine.
FIG. 3B shows a block diagram of a game cartridge that includes aspects of the present invention.

One embodiment of the present invention is shown in FIG. 3A as an illustration of a game cartridge 300 that includes code implementing the present invention adapted for insertion into a game machine such as prior art game machine 10. Another example is a code resident in the memory of the game machine.

As shown in the schematic block diagram of FIG. 3B, game cartridge 300 has a memory 302 that includes programs for operating game machine 10 and data files, including color video for display on the game machine, where the programs and data files are provided in accordance with the methods, data structure, and/or programs of an embodiment of the present invention. Thus, game cartridge 300 mates with connector 40, as shown in FIG. 3B, which is connected to CPU 25 for controlling game machine 10 and presenting images on color LCD 16.

An aspect of the present invention combines the representation of color images in a YUV-like color space with a modification—referred to herein as "dithering"—of the stored image for display to improve the visual quality of low color-depth resolution displays. Specifically, dithering includes processing an image by modifying at least one of the three color components of an individual image pixel, where one of the color components is an overall image luminance, according to one or more of the color components of surrounding pixels.

FIG. 4A is a transformation 401 from RGB color space to a YUV-like color space (denoted as Luma-Cb—Cr) used in a first embodiment of the present invention. FIG. 4B shows a transformation 403 from Luma-Cb—Cr color space to RGB color space as the inverse transformation of transformation 401. The Luma-Cb—Cr color space is closely related to YUV, YCbCr, and YIQ, but is not numerically identical. In one embodiment, color information is provided to the handheld device already in a Luma-Cb—Cr color space, or is provided in RGB, and is converted to the Luma-Cb—Cr color space using transformation 401, and can be converted back to RGB color space using inverse transformation 403.

In one embodiment, images are stored in compressed form to decompress to Y—Cb—Cr image of 24 bits per pixel, with 8-bits for each of Y, Cb, and Cr.

Alternative embodiments use alternate color representations including, but not limited to, other YUV-like color spaces having one luminance component, for example, YUV and YIQ color spaces. The use of YUV-like color space has many advantages. For example, less memory is usually required to store YUV-like coded images with no noticeable degradation in image quality. In addition, in YUV-like color space, the intensity or luminance is easily adjusted through one of the coordinates (Y) instead of all three in concert (R, G, and B). Representation in a YUV-like color space provides better contrast control, for example by having one luminance coordinate and two color coordinate, as opposed to having to modify the three color coordinates of RGB color space.

Such intensity adjusting may occur, for example, as a correction in response to ambient lighting. The output intensity can be changed by the user of game machine 10 by operating one or more of keys 48a-48, by controlling a display control input knob (not shown), or by toggling a display backlight control switch (also not shown). Alternatively, the portable game device containing the display includes a photodetector to provide an ambient light indication for automatic control.

Games are typically developed on computer systems having higher color-depth resolution than the display on the target game machine for the game. Thus, the images for display on a game machine such as machine 10 are typically generated on computer systems having higher color-depth resolution that the display 16. For example, the images may be generated on systems that have a color-depth resolution 24-bits for each pixel, e.g., as 8 bits for each of the 3 color components, and may be targeted for display on a display 16 that only provides 15-bits of color-depth resolution for each pixel, e.g., as 5 bits for each of 3 color components. In one embodiment, images are stored in compressed form that generates 24-bits per pixel in a YUV-like color space, e.g., Y—Cb—Cr, with 8-bits per color component. Alternate embodiments have a different number of bits per color component, e.g., 10 bits of Y and 7 bits of each of Cb and Cr. In one embodiment of the target display, e.g., display 16, the display accepts 15-bits of RGB data per pixel, with 5 bits per color coordinate. In one embodiment of the present invention, conversion is performed by simple numerical manipulations, such as register shifting. Thus, for example, a 24-bit to 15-bit conversion in RGB, YUV-like, or other color spaces is implemented by accepting the most significant 5 bits of each color component. With X denoting any of the input color components and Y the corresponding, lower color-depth resolution output component, the conversion can be expressed as the following shifting operation: $Y=X>>3$.

One common visual artifact of prior art methods of displaying images converted to a lower color-depth resolution is the appearance of color bands or contours. Thus, for example, a high- to low-color-depth resolution converted image having subtle changes in colors may appear, when displayed, to have bands (contours) of color at the lower color-depth resolution.

Dithering according to an aspect of the present invention, should reduce the visibility of such artifacts.

One embodiment of the invention applies dithering to an image in a YUV-like color space, to each of the Y-like, U-like, and V-like coordinates according to a dither matrix. The dither matrix is applied to each pixel on the original image to each color coordinate as follows. Take the position of a pixel on the image, having, for example a coordinate denoted Coord_in of depth N_in bits, and map it to the filter, modulo the size of the filter, for each component. Thus each pixel location of an image has one corresponding matrix position and matrix value. Next the original pixel value is converted from the original pixel color-depth resolution of N_in bits to a lower pixel color-depth resolution of N_out bits, and a value of one is added to the lower color-depth resolution value if a certain criteria are met. That criteria is that (Coord_in & ((N_in−N_out−1)) is greater than the dither matrix value at the modulo position of the pixel. The dither matrix application can be applied, in general to each pixel of an image using the following pseudo-code:

```
If ((Coord_in>>(N_in−N_out))<(2^Coord_out)−1)
   Coord_out=Coord_in >>(N_in−N_out)
   If (Coord_in & ((N_in−N_out)−1))>DitherMatrix(pixel-
      position))
      Add +1 to Coord_out
   EndIf
```

Otherwise,
Coord_out=(2^N_out)−1
EndIf where "pixelposition" is the position of the pixel being filtered. In practice, the modulo of the screen position is taken. In one embodiment, the pseudo-code is applied using a particular dither matrix and applied to each coordinate. In one embodiment, a program implementing the above pseudo-code is used to transform each YUV-like component from an input having N_out=8 bits into an output having N_out=5 bits. That is, the code converts Coord_in =Y into a dithered luminosity value Coord_out, and likewise for the U and V.

As a specific example, if we had a 8-bit color component of value C=206, located at coordinate 0,0 on the display. This position modulo maps this to the component 0,0 of the dithering matrix. Since the criteria is met, a 1 is added to the output, which for a 5-bit color output would be $C_O$=C/8+1=26. If the same value were to be displayed at a modulo screen position of 0,1 on the screen, the criteria would not be met and the value at that position would be different −$C_O$=C/8+0=25. In this example, the matrix has an even number of entries and thus the modulo operation is a shift, which is a fast operation.

A first embodiment of dithering according to a dither matrix is shown in FIG. 5A as a 3-bit dither filter 501, where 3-bit refers to filter values having 3 bits, ranging in value from 000 to 111 binary. A second embodiment of dithering according to a dither matrix is shown in FIG. 5B in the form of a 4-bit dither filter 503, where 4-bit refers to the filter having 4 bits, ranging in value from 0000 to 1111 binary. Each of dither filters 501 and 503 is designed to reduce the visual appearance of discrete colors when high color-depth resolution images are converted to low color-depth resolution images. Dither filters 501 and 503 are a diagonal cross pattern. Depending on its position on the screen, the value of a pixel will either be kept as it is or increased. The lower 3-bit value of the picture component is used for that purpose. If the value found (modulo position in a table) is smaller than the lower bits, then the color value is increased by one, otherwise it is kept the same.

Thus have been described herein a method embodiment of reducing the color depth resolution of color images.

One embodiment of each of the methods described herein is in the form of a computer program that executes on a processing system, e.g., a one or more processors that are part of an image display system. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of a carrier medium (e.g., a computer program product on a computer-readable storage medium) carrying computer-readable program code segments embodied in the medium. Any suitable computer readable medium may be used including a magnetic storage device such as a diskette or a hard disk, a game machine cartridge, or an optical storage device such as a CD-ROM.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. Thus, for example, the RGB to YUV-like color space and dither steps for preparing an image for display can be combined into a single mathematical transformation for application to an RGB image. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. Thus, the scope of the expression a device A coupled to a device B should not be limited to devices or systems wherein an output of device A is directly connected to an input of device B. It means that there exists a path between an output of A and an input of B which may be a path including other devices or means.

It should further be appreciated that although the coding of color information for display has not be discussed in detail, the invention is not limited to a specific coding method. Thus, for example, other color representations can be used, and other dither patterns may improve the appearance of the color image, and the invention is not limited to such contexts and may be utilized in various other applications and systems, for example in a system that other compressed media streams. Furthermore, the invention is not limited to any one type of network architecture and method of encapsulation, and thus may be utilized in conjunction with one or a combination of other network architectures/protocols.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

I claim:

1. A method of displaying an image on a display, the image being generated or stored with a first number of bits of color-depth resolution per pixel, the display having a second number of bits of color-depth resolution per pixel less than the first number of bits, said method comprising:
   accepting an image in a first color space at the first number of bits of color-depth resolution per pixel;
   in the case that the first color space is not in a color space having one luminance coordinate and two chrominance coordinates, converting the image to a color space having one luminance coordinate and two chrominance coordinates, with the luminance coordinate having a third number of bits of depth resolution and the chrominance coordinates each having a fourth number of bits of depth resolution;
   dithering the pixels of the image in the color space to produce an image in a color space with the luminance coordinate having a fifth number of bits of depth resolution and the chrominance coordinates each having a sixth number of bits of depth resolution; and
   converting the dithered image to RGB space for display, with each of R, G, and B having the second number of bits of color-depth resolution.

2. A method as recited in claim 1, wherein the first color space is a color space having one luminance coordinate and two chrominance coordinates, such that the dithering is of the coordinates of the accepted image.

3. A method as recited in claim 1, wherein said accepting an image includes:
   accepting an image stored in the first color space from a computer-readable carrier medium.

4. A method as recited in claim 3, wherein said carrier medium is in a game cartridge.

5. A method as recited in claim 1, wherein said first number of bits is 8 bits.

6. A method as recited in claim 1, wherein said second number of bits is 5 bits.

7. A method as recited in claim 1, wherein each color space is a Y—Cr—Cb color space.

8. A method as recited in claim 1, wherein said dithering further includes:
   accepting a dither matrix having a plurality of cells each having a value,
   for each pixel of at least one pixel of the image,
   assigning one of said plurality of cells to said each pixel,
   for each color component of said each pixel,
   transforming the value of said each color component to a first value in said second color space, and
   modifying said first value based on the outcome of a comparison of said first value and the value of the assigned cell of said each pixel.

9. A method as recited in claim 8, wherein said dither matrix is a square matrix and where each of said plurality of cells has a value corresponding to an n-bit number.

10. A method as recited in claim 9, wherein the n-bit number is a 3-bit number or a 4-bit number.

11. A method as recited in claim 9, wherein the values of said plurality of cells has a diagonal cross pattern in said dither matrix.

12. A method as recited in claim 8, wherein said assigning assigns the dither matrix cell having the modulo screen position of the pixel in the image.

13. A method as recited in claim 8, wherein said transforming includes performing a manipulation of said value in the first color space that results in a division of said value.

14. A method as recited in claim 13, wherein said manipulation includes a shifting of the bits of the value by a number of bits equal to the difference between the first number of bits and the second number of bits.

15. A method as recited in claim 8, wherein said modifying includes adding one to the first value if the first value is greater than the value of the assigned cell.

16. A computer readable carrier medium carrying one or more computer readable code segments to instruct a processor to display an image on a display, the image being generated or stored with a first number of bits of color-depth resolution per pixel, the display having a second number of bits of color-depth resolution per pixel less than the first number of bits, said method comprising:
   accepting an image in a first color space at the first number of bits of color-depth resolution per pixel;
   in the case that the first color space is not in a color space having one luminance coordinate and two chrominance coordinates, converting the image to a color space having one luminance coordinate and two chrominance coordinates, with the luminance coordinate having a third number of bits of depth resolution and the chrominance coordinates each having a fourth number of bits of depth resolution;
   dithering the pixels of the image in the color space to produce an image in a color space with the luminance coordinate having a fifth number of bits of depth resolution and the chrominance coordinates each having a sixth number of bits of depth resolution; and
   converting the dithered image to RGB space for display, with each of R, G, and B having the second number of bits of color-depth resolution.

17. A carrier medium as recited in claim 16, wherein the first color space is a color space having one luminance coordinate and two chrominance coordinates, such that the dithering is of the coordinates of the accepted image.

18. A carrier medium as recited in claim 16, wherein said accepting an image includes:
   accepting an image stored in the first color space from a carrier medium.

19. A carrier medium as recited in claim 17, where said carrier medium is in a game cartridge.

20. A carrier medium as recited in claim 16, wherein said first number of bits is 8 bits.

21. A carrier medium as recited in claim 16, wherein said second number of bits is 5 bits.

22. A carrier medium as recited in claim 16, wherein each color space is a Y—Cr—Cb color space.

23. A carrier medium as recited in claim 16, wherein said dithering further includes:
- accepting a dither matrix having a plurality of cells each having a value,
- for each pixel of at least one pixel of the image,
- assigning one of said plurality of cells to said each pixel,
- for each color component of said each pixel,
- transforming the value of said each color component to a first value in said second color space, and
- modifying said first value based on the outcome of a comparison of said first value and the value of the assigned cell of said each pixel.

24. A carrier medium as recited in claim 23, wherein said dither matrix is a square matrix and where each of said plurality of cells has a value corresponding to an n-bit number.

25. A carrier medium as recited in claim 24, wherein the n-bit number is a 3-bit number or a 4-bit number.

26. A carrier medium as recited in claim 24, wherein the values of said plurality of cells has a diagonal cross pattern in said dither matrix.

27. A carrier medium as recited in claim 23, wherein said assigning assigns the dither matrix cell having the modulo screen position of the pixel in the image.

28. A carrier medium as recited in claim 23, wherein said transforming includes performing a manipulation of said value in the first color space that results in a division of said value.

29. A carrier medium as recited in claim 28, wherein said manipulation includes a shifting of the bits of the value by a number of bits equal to the difference between the first number of bits and the second number of bits.

30. A method as recited in claim 23, wherein said modifying includes adding one to the first value if the first value is greater than the value of the assigned cell.

* * * * *